(12) United States Patent
Mesa et al.

(10) Patent No.: US 10,165,927 B2
(45) Date of Patent: Jan. 1, 2019

(54) HOLDING ASSEMBLY

(71) Applicant: ELECTROLUX APPLIANCES AKTIEBOLAG, Stockholm (SE)

(72) Inventors: Daniel Mesa, Stockholm (SE); Rickard Hederstierna, Stockholm (SE)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 15/323,066

(22) PCT Filed: Sep. 1, 2014

(86) PCT No.: PCT/EP2014/068528
§ 371 (c)(1),
(2) Date: Dec. 29, 2016

(87) PCT Pub. No.: WO2016/034201
PCT Pub. Date: Mar. 10, 2016

(65) Prior Publication Data
US 2017/0258294 A1 Sep. 14, 2017

(51) Int. Cl.
*A47L 15/50* (2006.01)
*F16B 2/22* (2006.01)

(52) U.S. Cl.
CPC ........... *A47L 15/505* (2013.01); *A47L 15/503* (2013.01); *F16B 2/22* (2013.01)

(58) Field of Classification Search
CPC ...... A47L 15/505; A47L 15/503; A47L 15/50; A47L 15/502; A47L 19/04; A47G 23/0208; F16B 2/22
USPC ............................................... 211/41.1–41.9
See application file for complete search history.

(56) References Cited

U.S. PATENT DOCUMENTS

| 2,213,918 A | | 9/1940 | Lofstrand, Jr. |
| 2,708,037 A | * | 5/1955 | Planeta .................. A47L 19/04 211/41.4 |
| 3,512,227 A | | 5/1970 | Krawagna |
| 3,627,300 A | * | 12/1971 | Caveney ................. B65B 27/10 100/7 |

(Continued)

FOREIGN PATENT DOCUMENTS

| CN | 201061516 Y | 5/2008 |
| CN | 101977539 A | 2/2011 |

(Continued)

OTHER PUBLICATIONS

International Search Report and Written Opinion for Application No. PCT/EP2012/076769 dated Feb. 11, 2013.

(Continued)

*Primary Examiner* — Patrick D Hawn
(74) *Attorney, Agent, or Firm* — Alston & Bird LLP

(57) ABSTRACT

A holding assembly for holding one or more stemmed objects in a dishwasher is provided. The holding assembly may include an elongated gripping unit frame and two or more gripping units arranged at the elongated gripping unit frame. The two or more gripping units may be arranged to grip a respective stemmed portion of the one or more stemmed objects. At least one of the two or more gripping units may be displaceably arranged along a longitudinal direction of the elongated gripping unit frame. The embodiments herein may also relate to a rack of a dishwasher and a dishwasher comprising a rack.

15 Claims, 5 Drawing Sheets

(56) References Cited

U.S. PATENT DOCUMENTS

| | | | |
|---|---|---|---|
| 3,752,322 A | 8/1973 | Fiocca et al. | |
| 4,029,277 A | 6/1977 | Bulanda | |
| 4,046,261 A * | 9/1977 | Yake | A47L 15/503 211/184 |
| 4,589,556 A | 5/1986 | Peretz | |
| 4,909,401 A | 3/1990 | McConnell | |
| 4,974,806 A * | 12/1990 | Matern | A47L 15/505 211/41.9 |
| 5,119,947 A * | 6/1992 | Stewart | A47G 23/0208 211/162 |
| 5,249,590 A | 10/1993 | Jacobus et al. | |
| D342,005 S | 12/1993 | Forsberg | |
| 5,277,387 A | 11/1994 | Lewis et al. | |
| 5,572,776 A | 11/1996 | Murphy et al. | |
| 5,918,749 A * | 7/1999 | Pille | A47L 15/502 211/41.8 |
| 6,123,204 A | 9/2000 | Nelson et al. | |
| 6,364,131 B1 * | 4/2002 | Moylan | A47L 15/505 211/41.8 |
| 6,394,285 B1 | 5/2002 | Arthurs et al. | |
| 6,827,225 B2 * | 12/2004 | Miilu | A47L 15/505 211/183 |
| 6,932,312 B1 | 8/2005 | Chen | |
| 7,231,929 B2 * | 6/2007 | Landsiedel | A47L 15/14 134/135 |
| D547,048 S | 7/2007 | Conway et al. | |
| 7,458,471 B2 | 12/2008 | Crudgington, Jr. | |
| 7,523,902 B2 | 4/2009 | Almeida | |
| 7,543,712 B2 | 6/2009 | Purushothaman | |
| 7,556,231 B2 | 7/2009 | Herbst et al. | |
| 7,665,475 B2 * | 2/2010 | Hedstrom | A47L 15/503 134/134 |
| 7,766,175 B2 * | 8/2010 | Jadhav | A47L 15/503 211/41.9 |
| D642,039 S | 7/2011 | Forsberg et al. | |
| 7,988,107 B2 | 8/2011 | Miller et al. | |
| 8,167,147 B2 * | 5/2012 | Frankel | A47L 19/04 211/41.3 |
| 8,573,576 B2 | 11/2013 | Clark et al. | |
| 8,701,898 B2 * | 4/2014 | Chai | A47L 15/503 211/150 |
| 8,757,419 B2 * | 6/2014 | Schessl | A47L 15/503 220/487 |
| 8,789,711 B2 * | 7/2014 | Haltmayer | A47L 15/503 211/41.9 |
| 9,615,722 B2 * | 4/2017 | Mesa | A47L 15/503 |
| 2004/0108283 A1 * | 6/2004 | Miilu | A47L 15/505 211/41.9 |
| 2005/0236344 A1 * | 10/2005 | Yang | A47L 19/04 211/41.4 |
| 2005/0236345 A1 | 10/2005 | Herbst et al. | |
| 2006/0113260 A1 * | 6/2006 | Purushothaman | A47L 15/505 211/41.8 |
| 2006/0138064 A1 | 6/2006 | Crudgington | |
| 2006/0254992 A1 | 11/2006 | Lim | |
| 2006/0289038 A1 | 12/2006 | Hedstrom et al. | |
| 2007/0125729 A1 * | 6/2007 | Krueger | A47G 23/0208 211/60.1 |
| 2007/0163626 A1 | 7/2007 | Klein | |
| 2008/0110480 A1 * | 5/2008 | Choi | A47L 15/503 134/135 |
| 2008/0135505 A1 * | 6/2008 | Frankel | A47L 19/04 211/41.4 |
| 2008/0149149 A1 | 6/2008 | Ryu et al. | |
| 2008/0185352 A1 | 8/2008 | O'Hara | |
| 2011/0192808 A1 | 8/2011 | Buhl et al. | |
| 2011/0247990 A1 | 10/2011 | Chai | |
| 2011/0290804 A1 | 12/2011 | Kohles et al. | |
| 2012/0292273 A1 | 11/2012 | McNamara | |
| 2014/0021149 A1 * | 1/2014 | Eng | A47L 15/505 211/41.8 |
| 2016/0037997 A1 * | 2/2016 | Mesa | A47L 15/503 134/166 R |
| 2017/0254472 A1 * | 9/2017 | Forsberg | F16M 13/02 |

FOREIGN PATENT DOCUMENTS

| | | |
|---|---|---|
| DE | 30 22 484 A1 | 1/1982 |
| DE | 92 16 330 U1 | 4/1994 |
| DE | 94 07 327 U1 | 7/1994 |
| DE | 94 21 847 U1 | 11/1996 |
| DE | 297 11 822 U1 | 10/1998 |
| DE | 297 20 069 U1 | 3/1999 |
| DE | 299 02 157 U1 | 5/1999 |
| DE | 298 22 086 U1 | 6/1999 |
| DE | 200 05 725 U1 | 8/2000 |
| EP | 1 356 761 A2 | 10/2003 |
| EP | 1 424 035 A1 | 6/2004 |
| EP | 1 683 465 A1 | 7/2006 |
| EP | 1 925 251 A2 | 5/2008 |
| EP | 1 929 928 A1 | 6/2008 |
| EP | 2 245 975 A1 | 11/2010 |
| EP | 2 353 488 A1 | 8/2011 |
| EP | 2 554 099 A2 | 2/2013 |
| EP | 2 554 101 A1 | 2/2013 |
| EP | 2 777 475 A1 | 9/2014 |
| FR | 2152375 A1 | 4/1973 |
| GB | 1393054 A | 5/1975 |
| GB | 2321394 A | 7/1989 |
| WO | WO 2005/042212 A1 | 5/2005 |
| WO | WO 2007/057135 A1 | 5/2007 |
| WO | WO 2009/097139 A1 | 8/2009 |
| WO | WO 2013/045543 A1 | 4/2013 |
| WO | WO 2013/098009 A1 | 7/2013 |
| WO | WO 2014/094898 A1 | 6/2014 |
| WO | WO 2014/108079 A1 | 7/2014 |

OTHER PUBLICATIONS

Office Action for U.S. Appl. No. 14/654,980 dated Jul. 1, 2016.
Notice of Allowance for U.S. Appl. No. 14/654,980 dated Dec. 6, 2016.
Office Action for Chinese Application No. 201280078146.7 dated Oct. 10, 2016.
International Search Report and Written Opinion for Application No. PCT/EP2014/068527 dated Nov. 26, 2014.
International Search Report and Written Opinion for Application No. PCT/EP2014/068528 dated May 11, 2015.
International Search Report and Written Opinion for Application No. PCT/EP2014/068529 dated May 7, 2015.
Office Action for U.S. Appl. No. 15/323,054 dated Dec. 13, 2017, 7 pages.
Office Action for Chinese Application No. 201480080489.6 dated Jul. 4, 2018, 12 pages.

* cited by examiner

HOLDING ASSEMBLY

CROSS-REFERENCE TO RELATED APPLICATIONS

This application is a national stage application filed under 35 U.S.C. § 371 of International Application No. PCT/EP2014/068528 filed Sep. 1, 2014, which application is hereby incorporated by reference in its entirety.

TECHNICAL FIELD

Embodiments herein relate to a holding assembly for holding one or more stemmed objects in a dishwasher. The embodiments herein also relates to a rack of a dishwasher and a dishwasher comprising a rack.

BACKGROUND

Interior environments of today's dishwashers are not always adapted to receive delicate items such as wine glasses, champagne glasses etc. The interior of a dishwasher is usually designed to receive plates and it is desirably if the interior is robust enough to receive heavy and bulky cookware such as pots and pans etc. Therefore, problems may arise when delicate items such as wine glasses, champagne glasses etc., are loaded into such an interior. In particular, one such problem is that when such items are loaded into a rack, a user usually has to handle the rack with great care, not to cause such items to fall. Even if a user does so, such items might fall anyway. Such falling may cause such delicate items to break. An option is to dish such items by hand, but dishwashing by hand is time consuming and many users also consider such activities to be burdensome. Also, items to be washed which are loaded into a dishwasher can have a variety of designs and sizes. This makes it difficult to design the interior of a dishwasher such that it can handle such different kind of items to be washed.

In view of above, there is a need for an improved holding assembly which may overcome some of the above mentioned problems.

SUMMARY

An object of the embodiments herein is to provide an improved holding assembly.

According to an aspect of the embodiments herein, the object is achieved by a holding assembly for holding one or more stemmed objects in a dishwasher, the holding assembly comprising an elongated gripping unit frame and two or more gripping units arranged at the elongated gripping unit frame, where the two or more gripping units are arranged to grip a respective stemmed portion of the one or more stemmed objects, and where at least one of the two or more gripping units is displaceably arranged along a longitudinal direction of the elongated gripping unit frame. Since, at least one of the two or more gripping units is displaceably arranged along a longitudinal direction of the elongated gripping unit frame, positioning of the one or more stemmed objects, within the dishwasher, is facilitated.

As a result, the above mentioned object is achieved.

Also, since at least one of the two or more gripping units is displaceably arranged along a longitudinal direction of the elongated gripping unit frame, a distance between two or more gripping units may be adjusted. As a result, a holding assembly is provided where stemmed objects, such as wine glasses, having different diameters can be held. Further, a space within a dishwasher in which the holding assembly is positioned may be utilized more efficiently and space may be provided for accommodating other form of dish than stemmed objects.

Optionally, each gripping unit has a gripping mode and a releasing mode where the each gripping unit is arranged to release the respective stemmed portion in the releasing mode, and where the each gripping unit is arranged to grip the respective stemmed portion in the gripping mode. Since each gripping unit has a gripping mode and a releasing mode, holding of one or more stemmed objects may be ensured and removement of the one or more stemmed objects from the holding assembly may be facilitated.

Optionally, each gripping unit comprises a first arm and a second arm and a flexible strip arranged between the first and second arms. Since each gripping unit comprises a first arm and a second arm and a flexible strip arranged between the first and second arms, gripping of the one or more stemmed objects may be further improved.

Optionally, the flexible strip is arranged to at least partially enclose the stemmed portion of one of the one or more stemmed objects when the gripping unit is in the gripping mode. Since the flexible strip is arranged to at least partially enclose the stemmed portion when each gripping unit is in the gripping mode, gripping of the one or more stemmed objects may be further improved.

Optionally, the first arm and the second arm are rotably arranged at the holding assembly and where a tip of the first arm and a tip of the second arm are arranged to be closer to each other when the gripping unit is in the gripping mode than in the releasing mode. Thereby, gripping of a stemmed portion of a stemmed object may be further improved.

Optionally, the elongated gripping unit frame comprises one or more snap fittings, and where the holding assembly is arranged to be snapped onto a rack of the dishwasher via the one or more snap fittings. Since the elongated gripping unit frame comprises one or more snap fittings, the holding assembly provided may easily be snapped onto, and removed from, a rack of the dishwasher. Thereby, a user may snap the holding assembly onto an already existing rack of the dishwasher and may remove the holding assembly, from the rack, when it is not to be used.

Optionally, the one or more snap fittings are displaceably arranged along the longitudinal direction of the elongated gripping unit frame. Since the one or more snap fittings are displaceably arranged along the longitudinal direction of the elongated gripping unit frame, a holding assembly is provided which may be snapped onto racks having different designs. That is, the holding assembly may be snapped onto racks having different distances between wires of the racks.

Optionally, the snap fittings are arranged to allow the holding assembly to be folded between at least a gripping position and a storing position in relation to the rack of the dishwasher. Thereby, the holding assembly may be folded into a storing position when it is not in use to thereby provide space to other items to be washed than stemmed objects, and which may be folded into the gripping position when it is to be used.

Optionally, the holding assembly comprises a gripping unit side comprising the two or more gripping units and a rear side opposite to the gripping unit side, where the rear side comprises a wall being arranged with an angle in the range of 100-120 degrees, preferably in the range of 105-115 degrees, more preferably approximately 110 degrees, to a main extension plane of the holding assembly. Thereby, washing and drying of a stemmed object, being held in a dishwasher by a holding assembly provided, may be improved since water more easily may reach portions of such a stemmed object and water may run off such a stemmed object in a more efficient manner. In particular, drying of stemmed objects, such as wine glasses and champagne flutes, may be improved since water may run off from a bowl-shaped foot portion of such a glass, due to the rear side comprising a wall being arranged with an angle in the range of 100-120 degrees, preferably in the range of 105-115 degrees, more preferably approximately 110 degrees, to a main extension plane of the holding assembly.

According to a second aspect of the embodiments herein, the object is achieved by a rack of a dishwasher comprising a holding assembly according to some embodiments.

According to a third aspect of the embodiments herein, the object is achieved by a dishwasher comprising a rack according to some embodiments.

Further features of, and advantages with, the embodiments herein will become apparent when studying the appended claims and the following detailed description. Those skilled in the art will realize that the different features described may be combined to create embodiments other than those described in the following, without departing from the scope of the embodiments herein, as defined by the appended claims.

BRIEF DESCRIPTION OF THE DRAWINGS

The various aspects of the embodiments herein, including its particular features and advantages, will be readily understood from the following detailed description and the accompanying drawings, in which.

DETAILED DESCRIPTION

The embodiments herein will now be described more fully with reference to the accompanying drawings, in which example embodiments are shown. Disclosed features of example embodiments may be combined. Like numbers refer to like elements throughout.

Well-known functions or constructions will not necessarily be described in detail for brevity and/or clarity.

Figure 1:
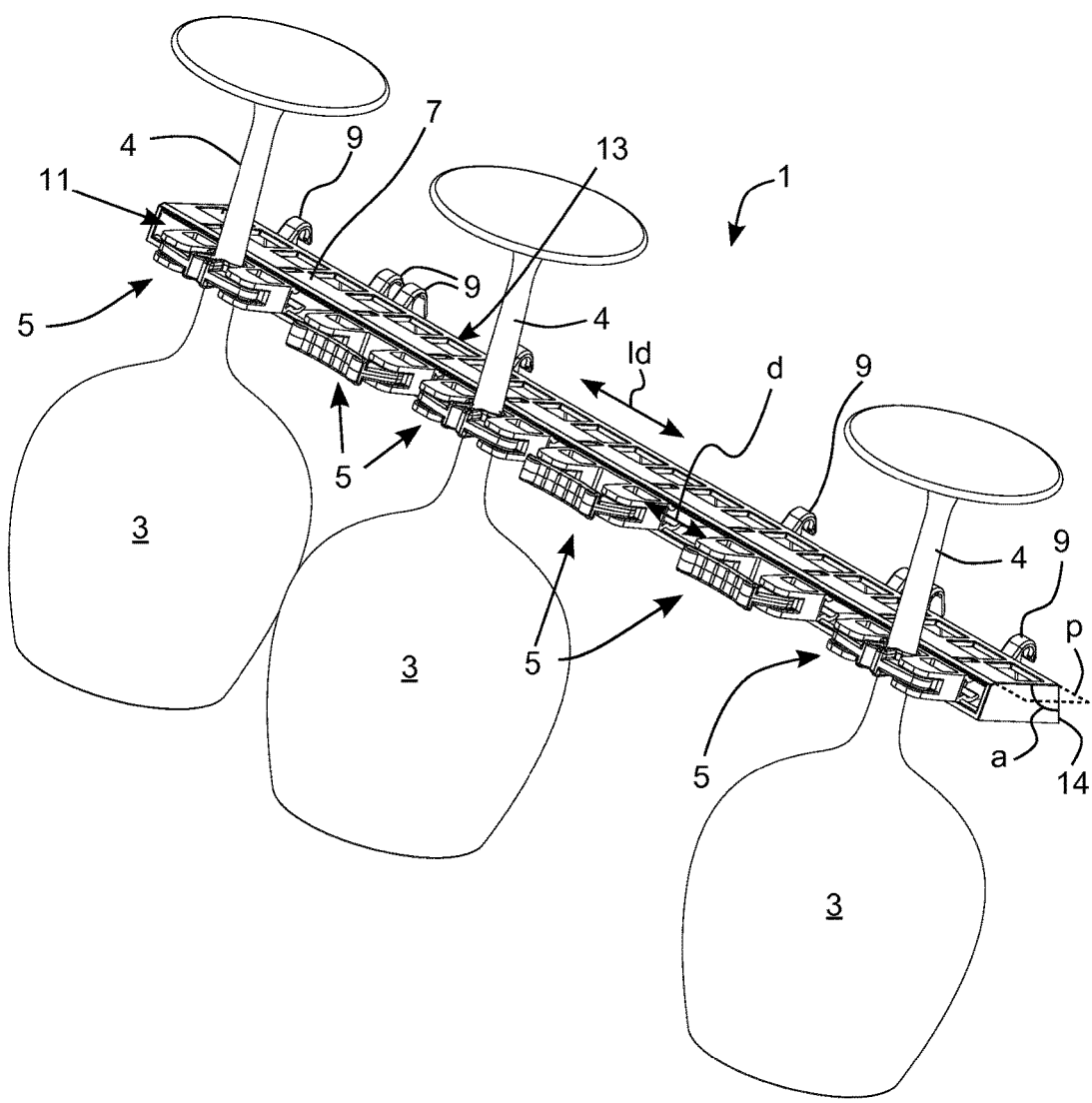
FIG. 1 illustrates a holding assembly for holding one or more stemmed objects in a dishwasher.

FIG. 1 illustrates an exemplifying holding assembly 1 for holding one or more stemmed objects 3 in a dishwasher. The holding assembly 1 comprises an elongated gripping unit frame 7 and two or more gripping units 5 arranged at the elongated gripping unit frame 7. The two or more gripping units 5 are arranged to grip a respective stemmed portion 4 of the one or more stemmed objects 3. At least one of the two or more gripping units 5 is displaceably arranged along a longitudinal direction ld of the elongated gripping unit frame 7.

Two or more of, or even all of, the gripping units 5 may be displaceably arranged along the longitudinal direction ld of the elongated gripping unit frame 7. All six gripping units 5 of the holding assembly 1 illustrated in FIG. 1 are displaceably arranged along the longitudinal direction ld of the elongated gripping unit frame 7. The holding assembly 1 provided may comprise more than, or fewer than, six gripping units 5.

Since at least one of the two or more gripping units 5 is displaceably arranged, a distance d between the two or more gripping units 5 can be adjusted. Thereby, stemmed objects 3, such as wine glasses, having different diameters can be held in the holding assembly provided. Further, a space within a dishwasher in which the holding assembly is positioned may be utilized more efficiently and space may be provided for accommodating other form of dish than stemmed objects within a dishwasher.

As illustrated in FIG. 1, the elongated gripping unit frame 7 may comprise a rail structure in which the gripping units 5 are slidably arranged.

Each gripping unit 5 of the holding assembly 1 illustrated in FIG. 1 has a gripping mode and a releasing mode where each gripping unit 5 is arranged to release the respective stemmed portion 4 in the releasing mode, and where each gripping unit 5 is arranged to grip the respective stemmed portion 4 in the gripping mode.

Figure 2:
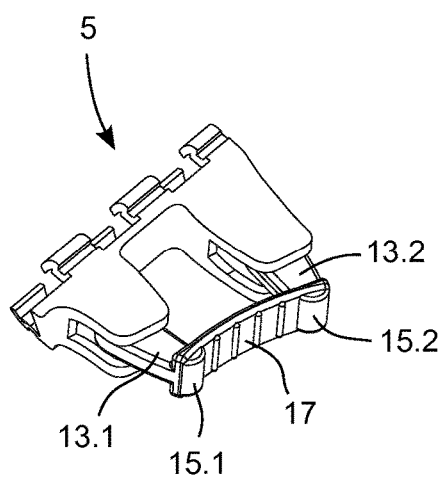
FIG. 2 illustrates a gripping unit of the holding assembly illustrated in FIG. 1 in a releasing mode.
Figure 3:
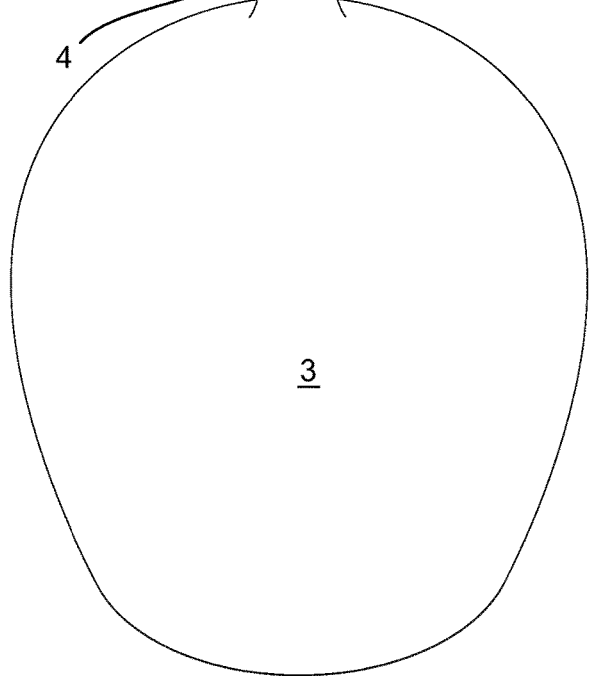
FIG. 3 illustrates the gripping unit of the holding assembly in a releasing mode.

FIG. 2 illustrates a gripping unit 5 of the holding assembly 1 illustrated in FIG. 1 in a releasing mode and FIG. 3 illustrates the gripping unit 5 of the holding assembly in a releasing mode. As can be seen in FIG. 2 and FIG. 3, each gripping unit 5 comprises a first arm 13.1 and a second arm 13.2 and a flexible strip 17 arranged between the first and second arms 13.1, 13.2. Also, as illustrated in FIG. 3 the flexible strip 17 is arranged to at least partially enclose the stemmed portion 4 of one of the one or more stemmed objects 3 when the gripping unit 5 is in the gripping mode.

Also, as can be seen in FIG. 2 and FIG. 3, the first arm 13.1 and the second arm 13.2 are rotably arranged at the holding assembly and where a tip 15.1 of the first arm 13.1 and a tip 15.2 of the second arm 13.2 are arranged to be closer to each other when the gripping unit 5 is in the gripping mode than in the releasing mode.

The flexible strip 17 and/or the first arm 13.1 and the second arm 13.2 may be provided in a soft material. The soft material may be a ThermoPlastic Elastomers (TPE).

As illustrated in FIG. 1 the elongated gripping unit frame 7 comprises one or more snap fittings 9. The snap fittings 9 allow the holding assembly 1 to be snapped onto a rack of a dishwasher. The snap fittings 9 may be displaceably arranged along the longitudinal direction ld of the elongated gripping unit frame 7. Thereby, a holding assembly 1 is provided which may be snapped onto racks having different designs. That is, a holding assembly 1 is provided which may be snapped onto racks having different distances between wires of the racks.

Figure 4:
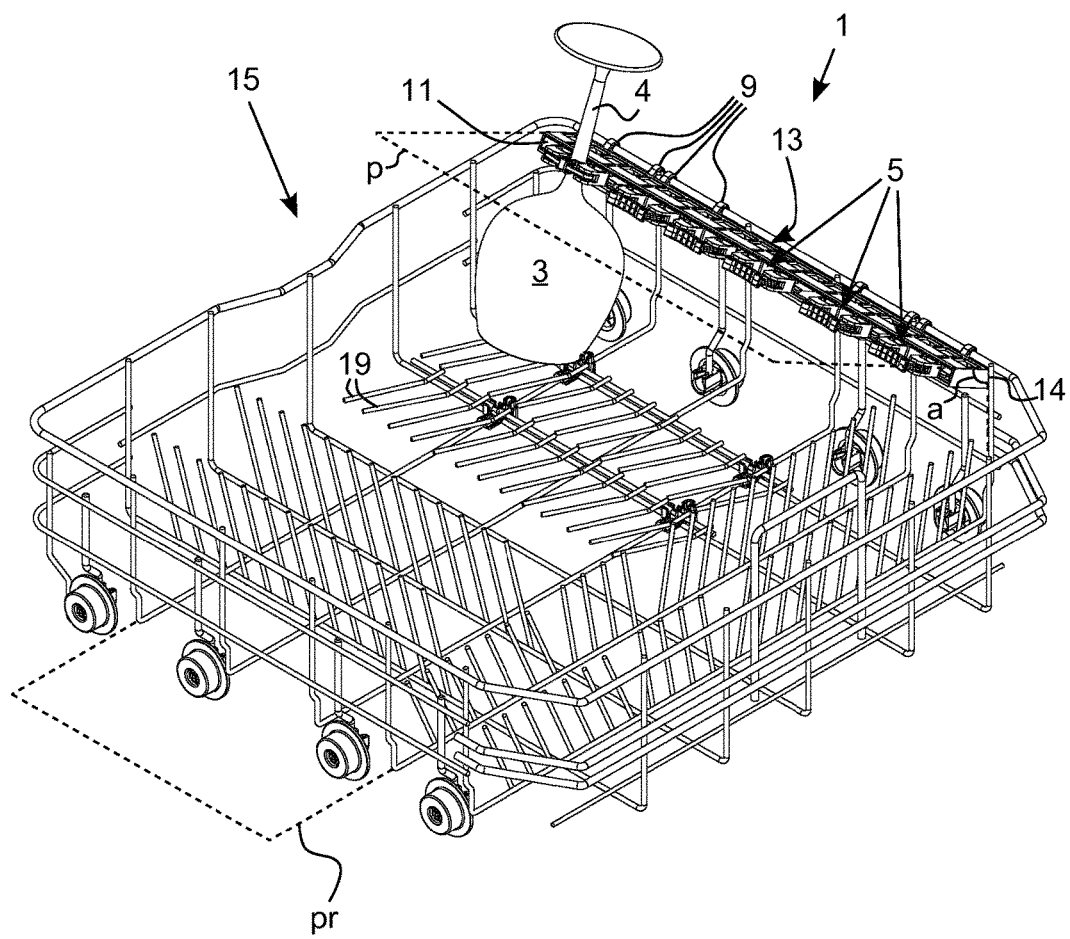
FIG. 4 illustrates a rack comprising a holding assembly according to some embodiments.

FIG. 4 illustrates a rack 15 comprising a holding assembly 1 according to some embodiments.

Snap fittings 9 of the holding assembly are arranged to allow the holding assembly 1 to be folded between at least a gripping position and a storing position in relation to the rack 15. In FIG. 4, the holding assembly 1 is illustrated in the gripping position.

Figure 5:
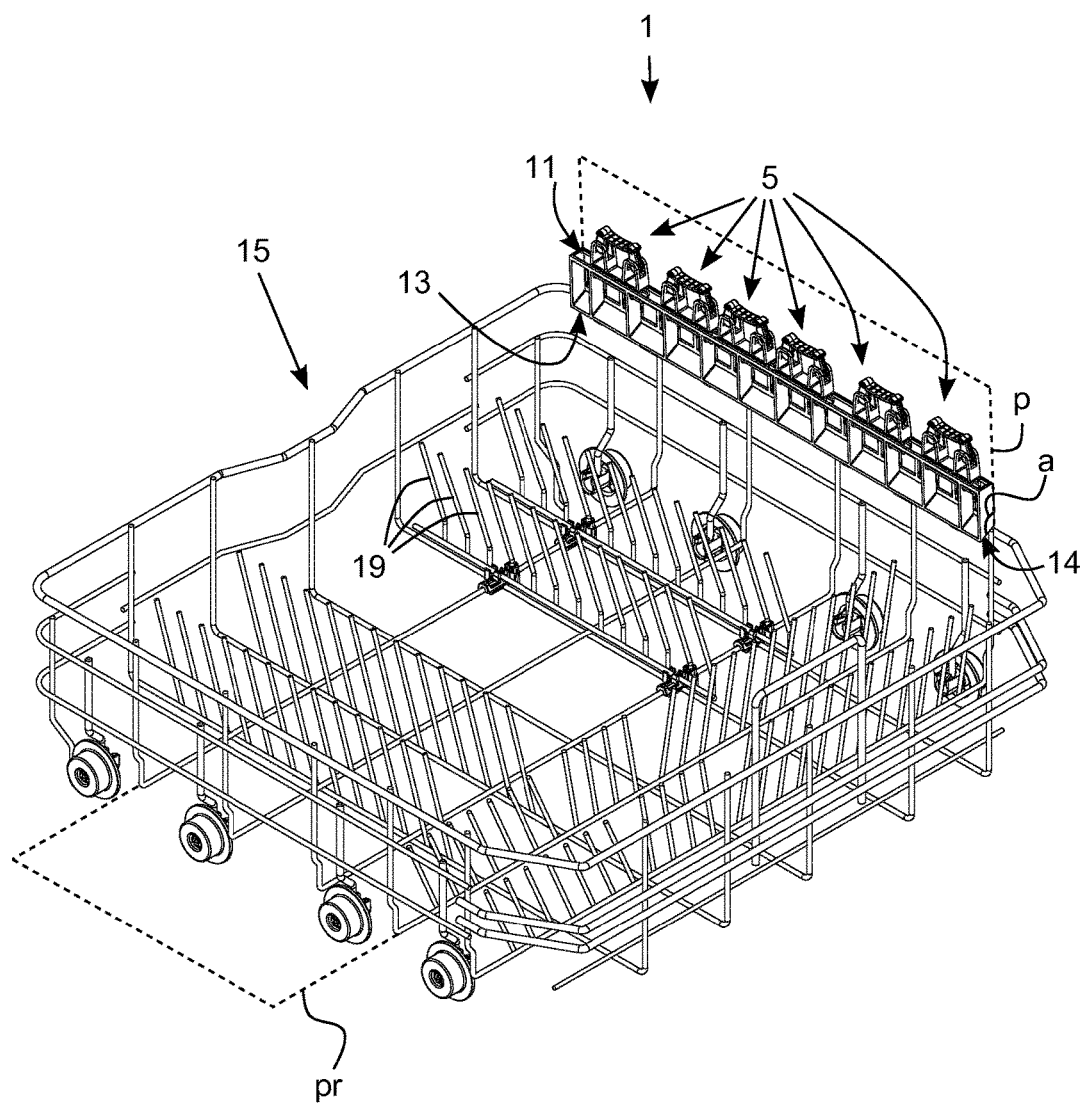
FIG. 5 illustrates the rack illustrated in FIG. 4 with the holding assembly in a storing position.

FIG. 5 illustrates the rack illustrated in FIG. 4 with the holding assembly 1 in the storing position. As illustrated, the holding assembly may be tilted upwards to the storing position to thereby provide space for other form of dish than stemmed objects within the rack 15. Also, as can be seen in FIG. 4 and FIG. 5, tines 19 of the rack 15 has been folded to an upright position in FIG. 5 in comparison to the tines 19 illustrated in FIG. 4. Thereby, flat items to be washed, such as plates, can be accommodated in the rack 15 when the holding assembly 1 is in the storing position.

As can be seen in FIG. 1, FIG. 4 and FIG. 5 the holding assembly 1 comprises a gripping unit side 11 comprising the two or more gripping units 5 and a rear side 13 opposite to the gripping unit side 11. The rear side 13 comprises a wall 14 which is arranged with an angle a in the range of 100-120 degrees, preferably in the range of 105-115 degrees, more preferably approximately 110 degrees, to a main extension plane p of the holding assembly 1. The wall 14 is arranged to abut against wires of the rack 15 when the holding assembly is in the gripping position. Each gripping unit 5 are arranged to grip a stemmed portion of a stemmed object such that the stemmed portion, when gripped, is essentially perpendicular to the main extension plane p of the holding assembly 1.

The advantages with these features are illustrated in FIG. 4, namely that the main extension plane p will assume a corresponding angle to a main extension plane pr of the rack 15, namely an angle a in the range of 100-120 degrees, preferably in the range of 105-115 degrees, more preferably approximately 110 degrees. Thereby, washing and drying of a stemmed object 3, being held in a dishwasher by a holding assembly 1 provided, may be improved since water may more easily reach portions of such a stemmed object 3 and water may run off such a stemmed object 3 in a more efficient manner. In particular, drying of stemmed objects 3, such as wine glasses and champagne flutes, may be improved since water may run off from a bowl-shaped foot portion of such a glass. Further, stemmed objects 3, such as wine glasses and champagne flutes, may have a height exceeding a height h of the rack 15. Thus, these features may facilitate, and/or allow, positioning of such stemmed objects in the holding assembly 1.

Figure 6:
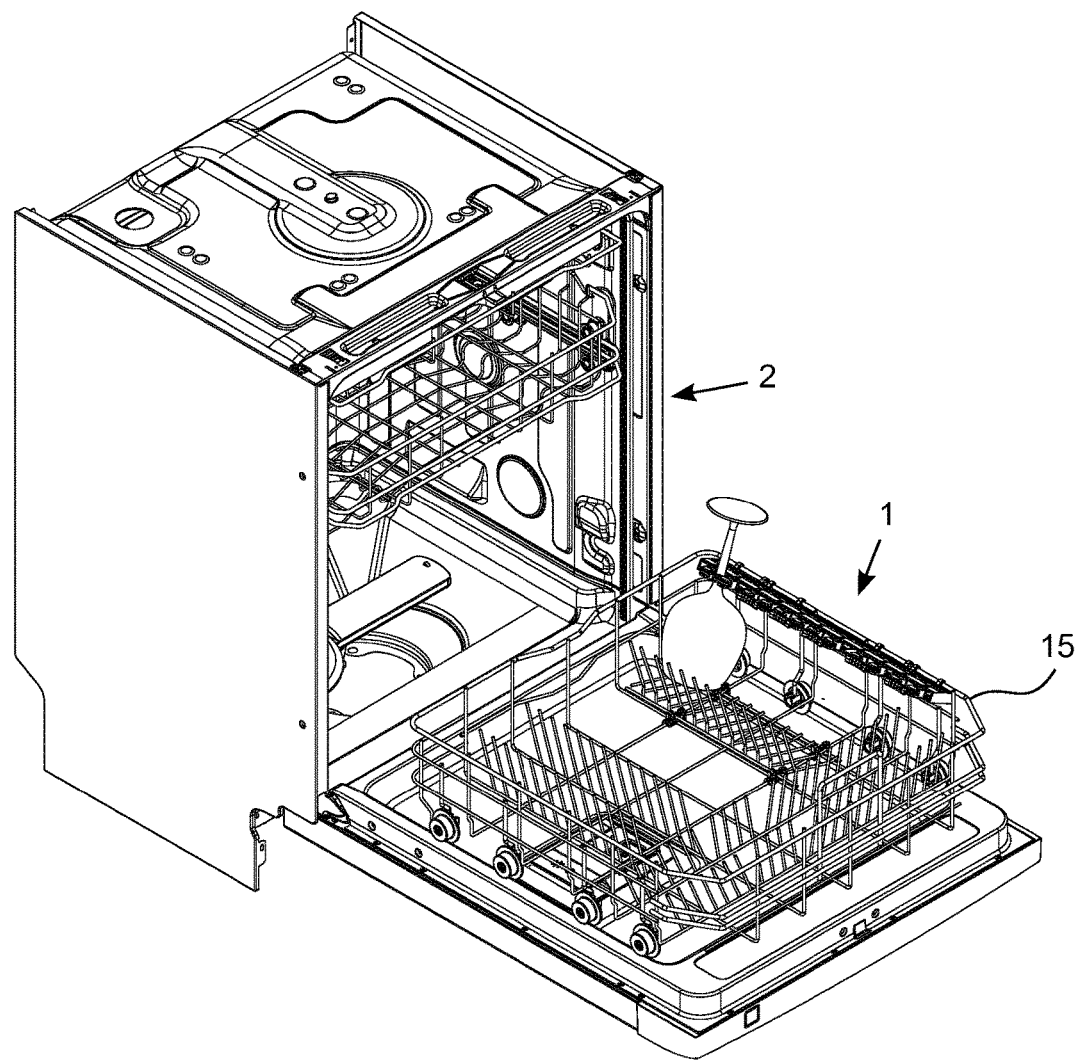
FIG. 6 illustrates a dishwasher comprising the rack illustrated in FIG. 4 and FIG. 5.

FIG. 6 illustrates a dishwasher 2 comprising the rack 15 illustrated in FIG. 4 and FIG. 5. As illustrated, the rack 15 may be a lower rack of a dishwasher 2. According, a holding assembly 1 is provided which may allow the lower rack 15 of the dishwasher 2 to be used to accommodate delicate items such as wine glasses or champagne glasses in a safe manner.

It is to be understood that the foregoing is illustrative of various example embodiments and the embodiments herein is not to be limited to the specific embodiments disclosed and that modifications to the disclosed embodiments, combinations of features of disclosed embodiments as well as other embodiments are intended to be included within the scope of the appended claims.

The invention claimed is:

1. A rack of a dishwasher comprising a holding assembly for holding one or more stemmed objects, said holding assembly comprising:
   an elongated gripping unit frame configured to be attached to the rack of the dishwasher; and
   two or more gripping units comprising at least a first gripping unit and a second gripping unit, wherein the first gripping unit and the second gripping unit are adjustably arranged along a longitudinal direction (ld) of the elongated gripping unit frame,
   wherein the first gripping unit is configured to grip a first stemmed portion of a first stemmed object and hold a first length of the first stemmed portion perpendicular to the longitudinal direction (ld) and perpendicular to a main extension plane (p) of the holding assembly,
   wherein the second gripping unit is arranged to grip a second stemmed portion of a second stemmed object and hold a second length of the second stemmed portion perpendicular to the longitudinal direction (ld) and perpendicular to the main extension plane (p) of the holding assembly, and
   wherein at least one of said two or more gripping units is displaceably arranged along the longitudinal direction (ld) of said elongated gripping unit frame, such that first gripping unit is configured to hold the first stemmed object at two or more different distances from the second gripping unit and second stemmed object relative to the longitudinal direction (ld).

2. The rack of a dishwasher according to claim 1, wherein each gripping unit further comprises:
   a gripping mode; and
   a releasing mode, wherein each gripping unit is configured to release the respective first stemmed portion or the second stemmed portion in the releasing mode, and wherein each gripping unit is configured to grip the respective first stemmed portion or the second stemmed portion in the gripping mode.

3. The rack of a dishwasher according to claim 2, where each gripping unit comprises a first arm, a second arm, and a flexible strip arranged between the first arm and the second arm.

4. The rack of a dishwasher according to claim 3, where said flexible strip is arranged to at least partially enclose said respective first stemmed portion or the second stemmed portion of one of the respective first stemmed object or the second stemmed object when said gripping unit is in said gripping mode.

5. The rack of a dishwasher according to claim 3, where said first arm and said second arm are rotably arranged at said holding assembly and where a tip of said first arm and a tip of said second arm are arranged to be closer to each other when said gripping unit is in said gripping mode than in said releasing mode.

6. The rack of a dishwasher according to claim 1, where said elongated gripping unit frame comprises one or more snap fittings, and where said holding assembly is arranged to be snapped onto said rack of the dishwasher via said one or more snap fittings.

7. The rack of a dishwasher according to claim 6, where said one or more snap fittings are displaceably arranged along said longitudinal direction (ld) of said elongated gripping unit frame, and said snap fittings are configured to move in said longitudinal direction relative to said elongated gripping unit frame.

8. The rack of a dishwasher according to claim 6, where said snap fittings are arranged to allow said holding assembly to be folded between at least a gripping position and a storing position in relation to said rack of said dishwasher.

9. The rack of a dishwasher according to claim 1, where said holding assembly comprises a gripping unit side comprising said two or more gripping units and a rear side opposite to said gripping unit side, where said rear side comprises a wall being arranged with an angle (a) in the range of 100-120 degrees, to a main extension plane (p) of said holding assembly.

10. A dishwasher comprising the rack according to claim 1.

11. The rack of a dishwasher according to claim 6, wherein the one or more snap fittings comprise two or more snap fittings, wherein the two or more snap fittings are movable in the longitudinal direction relative to the elongated gripping unit such that a distance in the longitudinal direction between each pair of snap fittings is adjustable to engage dishwasher racks having different distances between wires.

12. The rack of a dishwasher according to claim 11, wherein the two or more snap fittings are positioned on an opposite side of the elongated gripping unit frame than the two or more gripping units, and wherein the two or more snap fittings are positioned on the main extension plane (p) of the holding assembly.

13. The rack of a dishwasher according to claim 1, wherein each of the two or more gripping units further comprise a plurality of tabs configured to be received by a corresponding groove defined by the elongated gripping unit frame.

14. The rack of a dishwasher according to claim 13, wherein the plurality of tabs of each of the two or more gripping units are alternatingly arranged at a top and a bottom surface of each gripping unit.

15. The rack of a dishwasher according to claim 1, wherein:
  the elongated gripping unit frame is pivotally attached on a first end to the rack of the dishwasher via a plurality of snap fittings disposed at the first end such that the elongated gripping unit frame is adjustable along the rack of the dishwasher in the longitudinal direction; and
  the two or more gripping units engage an end surface at a second end of the elongated gripping unit frame opposite the first end, wherein the main extension plane (p) of the holding assembly spans the first end and the second end, and wherein the end surface is perpendicular to the main extension plane (p).

* * * * *